United States Patent
Connell

(10) Patent No.: US 10,414,602 B1
(45) Date of Patent: Sep. 17, 2019

(54) APPARATUS AND METHOD FOR PICK AND PLACEMENT OF BULK ITEMS

(71) Applicant: DRC Engineering, Inc., Sartell, MN (US)

(72) Inventor: Douglas Robert Connell, Sartell, MN (US)

(73) Assignee: DRC Engineering, Inc., Sartell, MN (US)

( * ) Notice: Subject to any disclaimer, the term of this patent is extended or adjusted under 35 U.S.C. 154(b) by 0 days.

(21) Appl. No.: 15/782,369

(22) Filed: Oct. 12, 2017

Related U.S. Application Data

(60) Provisional application No. 62/496,262, filed on Oct. 12, 2016.

(51) Int. Cl.
| | |
|---|---|
| B65G 43/00 | (2006.01) |
| B65G 43/08 | (2006.01) |
| B65G 47/91 | (2006.01) |
| B65G 47/84 | (2006.01) |
| B65G 29/02 | (2006.01) |
| B25J 15/06 | (2006.01) |

(52) U.S. Cl.
CPC ........ B65G 47/917 (2013.01); B25J 15/0641 (2013.01); B65G 29/02 (2013.01); B65G 43/08 (2013.01); B65G 47/848 (2013.01); B65G 2201/0202 (2013.01); B65G 2203/0208 (2013.01); B65G 2203/044 (2013.01); B65G 2203/045 (2013.01)

(58) Field of Classification Search
None
See application file for complete search history.

(56) References Cited

U.S. PATENT DOCUMENTS

| | | | |
|---|---|---|---|
| 2,359,433 A | 10/1944 | McNamara | |
| 2,606,658 A | 8/1952 | Powell | |
| 2,633,254 A | 3/1953 | Reynolds | |
| 3,302,803 A | 2/1967 | Mooney | |
| 3,589,531 A | 6/1971 | Povlacs | |
| 3,802,547 A * | 4/1974 | Wagers, Jr. | A61J 3/074 198/411 |
| 3,941,233 A | 3/1976 | Aiuola et al. | |
| 5,318,165 A | 6/1994 | Spatafora et al. | |
| 5,381,884 A | 1/1995 | Spatafora et al. | |
| 5,478,193 A | 12/1995 | Vonier et al. | |
| 5,725,082 A | 3/1998 | Connell | |
| 6,151,866 A | 11/2000 | Connell | |
| 6,732,498 B2 * | 5/2004 | Keen | B65B 65/08 198/471.1 |
| 6,881,907 B2 | 4/2005 | Winkelmolen | |
| 7,770,717 B2 | 8/2010 | Pedersen et al. | |

* cited by examiner

*Primary Examiner* — Kavel Singh
(74) *Attorney, Agent, or Firm* — Deirdre M Kvale; DMK Intellectual Property Law PLLC

(57) ABSTRACT

An assembly and method for moving bulk items from a first location to a second location is disclosed. The items are moved from the first location to the second location through a pick-up head. Vacuum pressure is supplied to the head to pick-up an item at the first location and carry the item to the second location. A detector is located between the first location and the second location to detect if an item has been picked up by the head. If no item is detected, the head is closed to the vacuum pressure through a control mechanism or closure element.

20 Claims, 14 Drawing Sheets

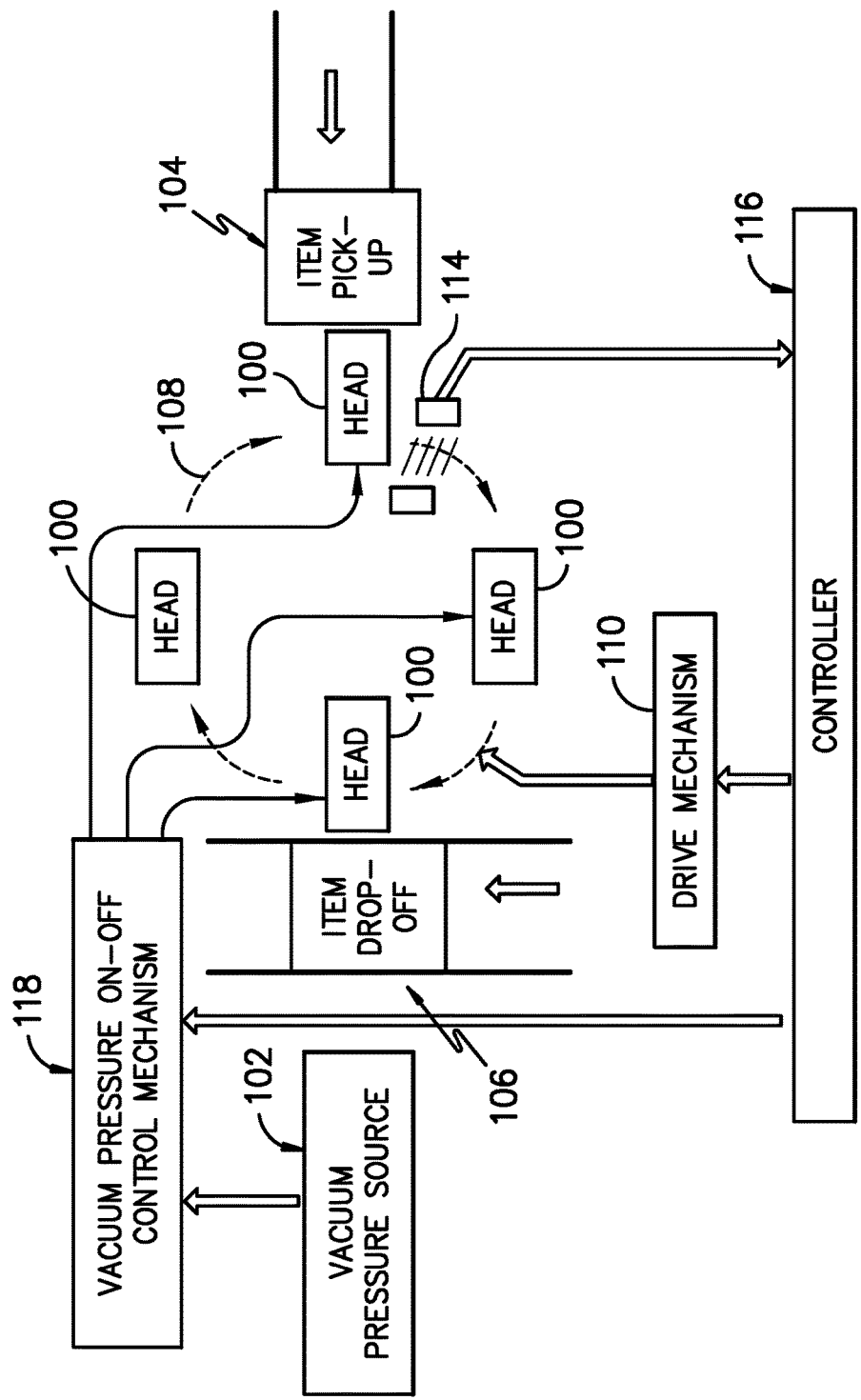
FIG. -1A-

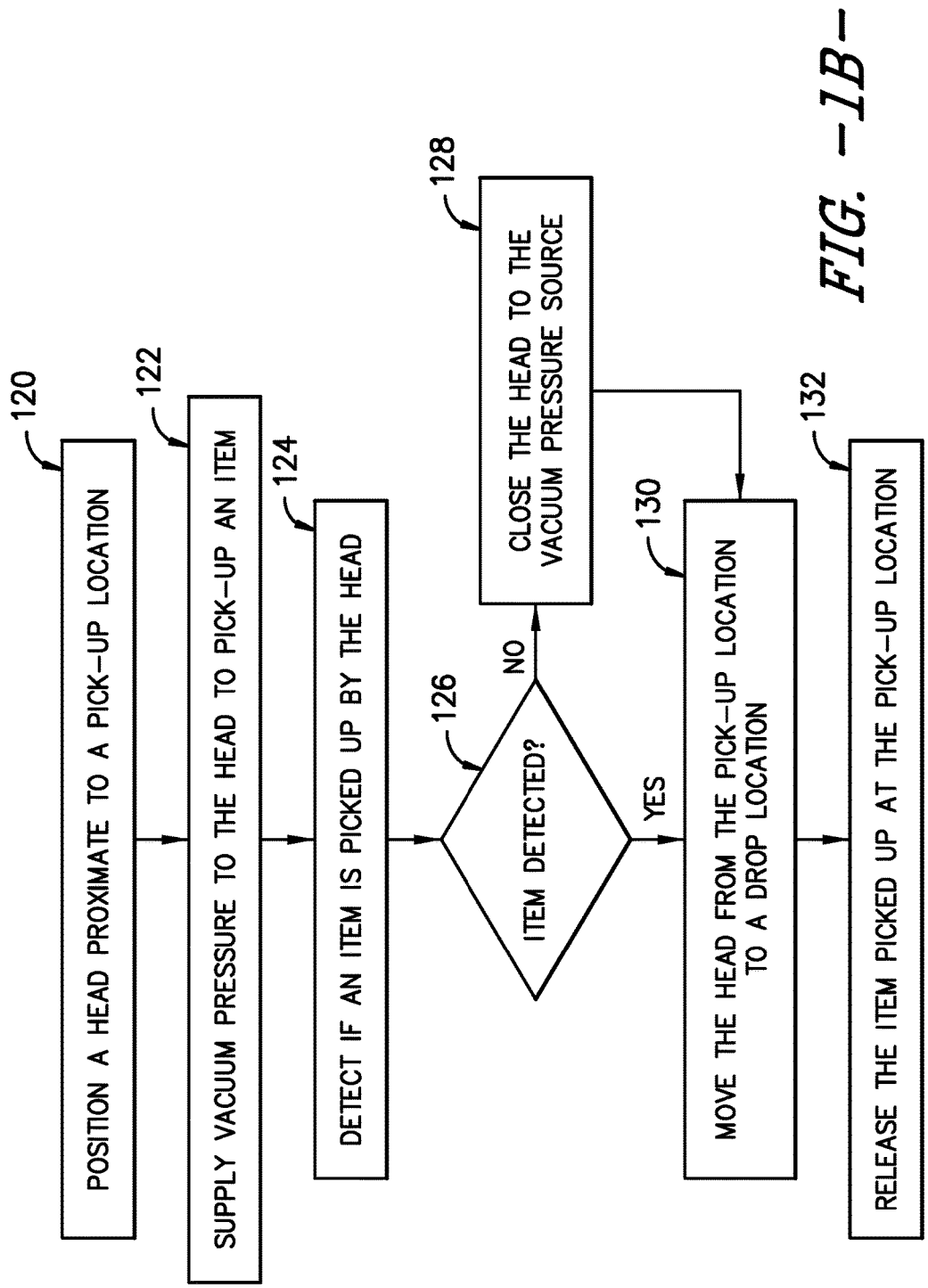

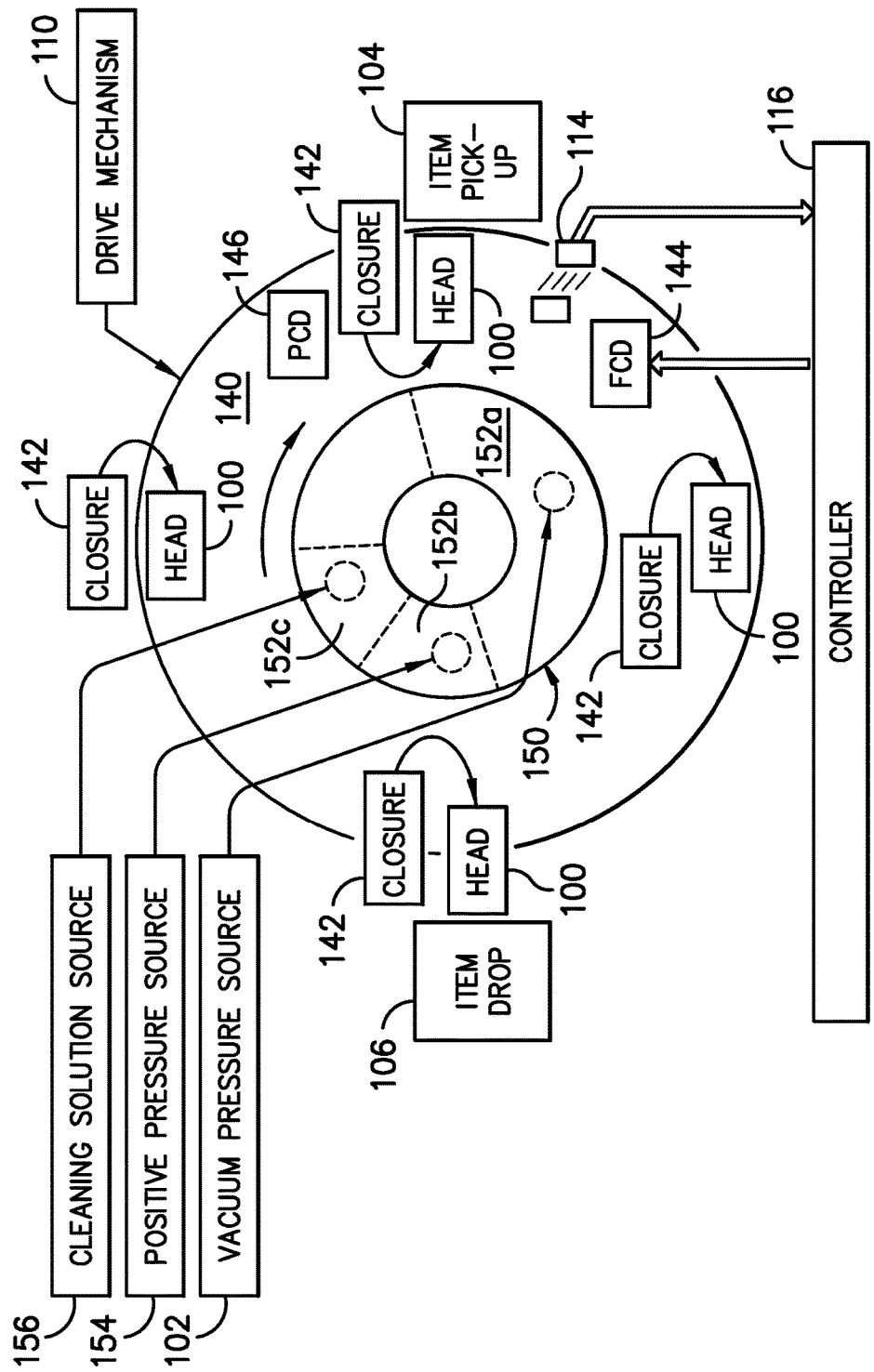
FIG. -2A-

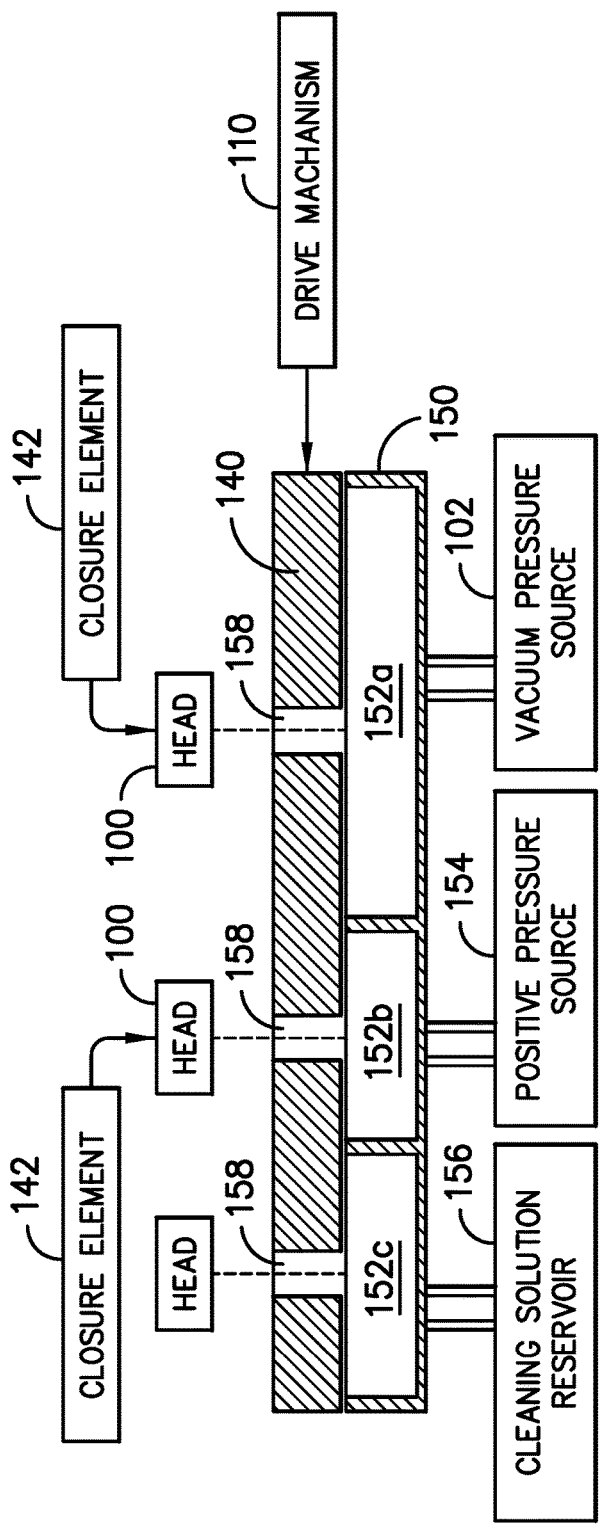
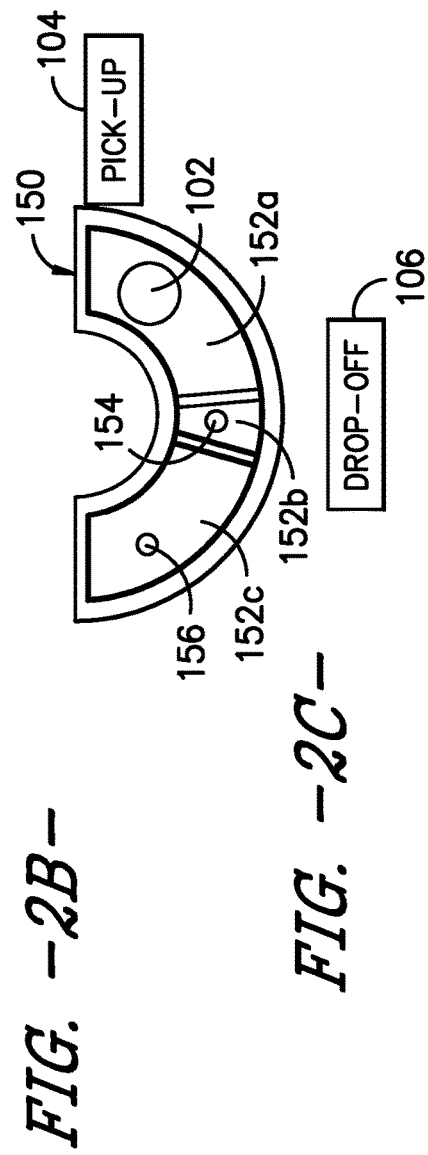
FIG. -2B-
FIG. -2C-

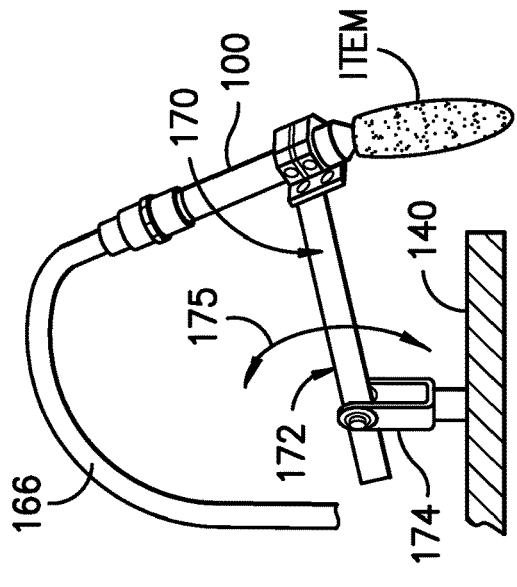
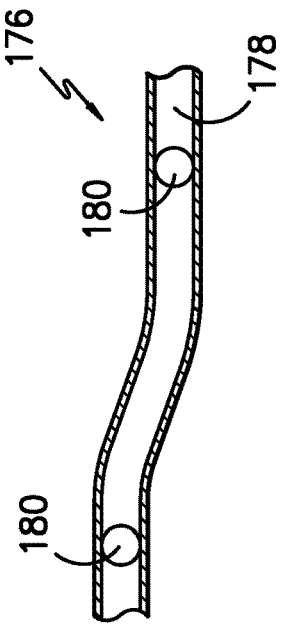
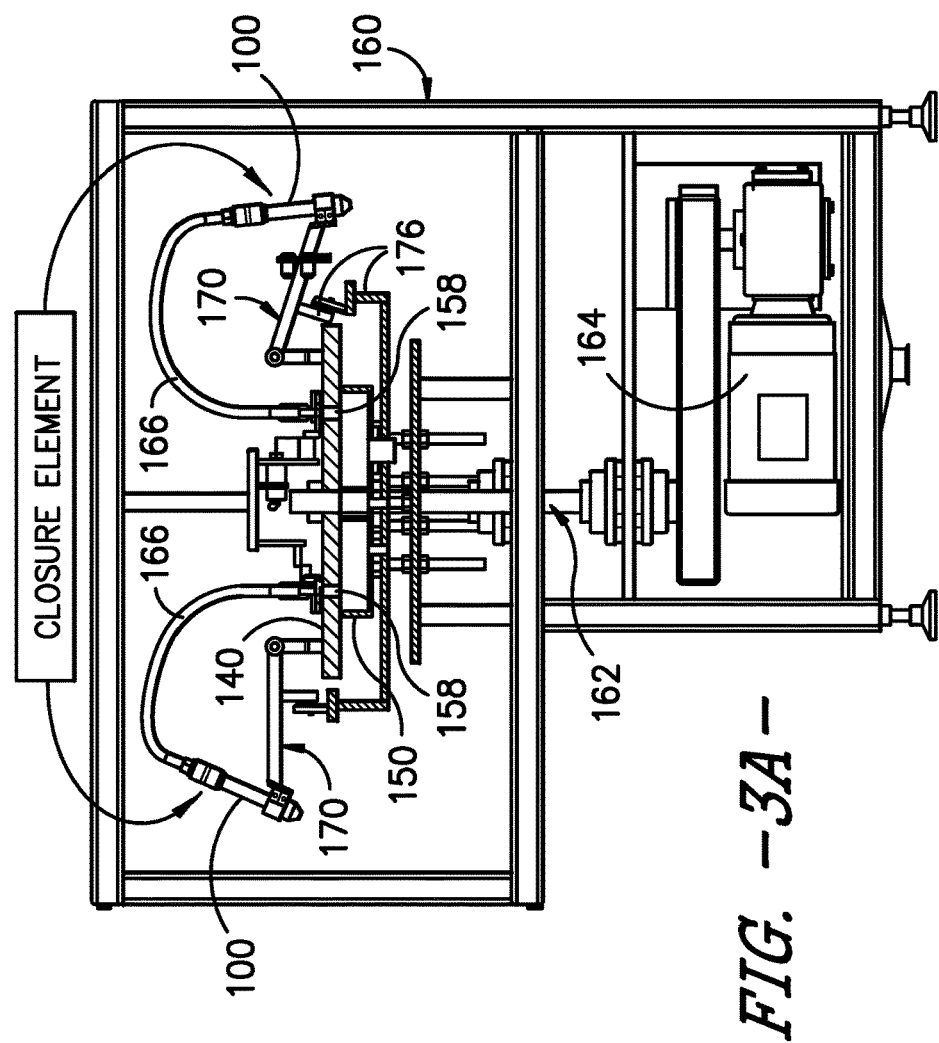
FIG. -3A-
FIG. -3B-
FIG. -3C-

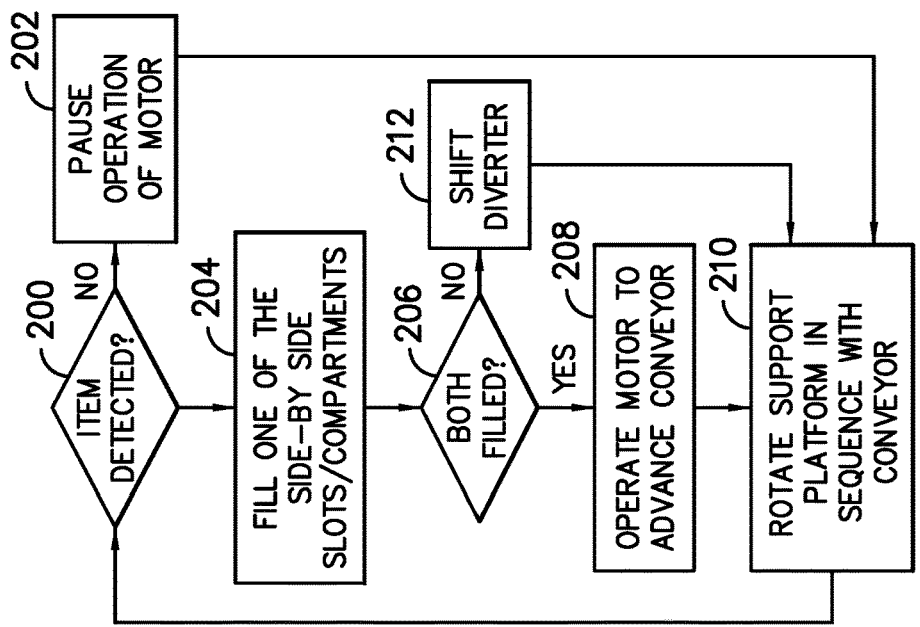
FIG. -4D-
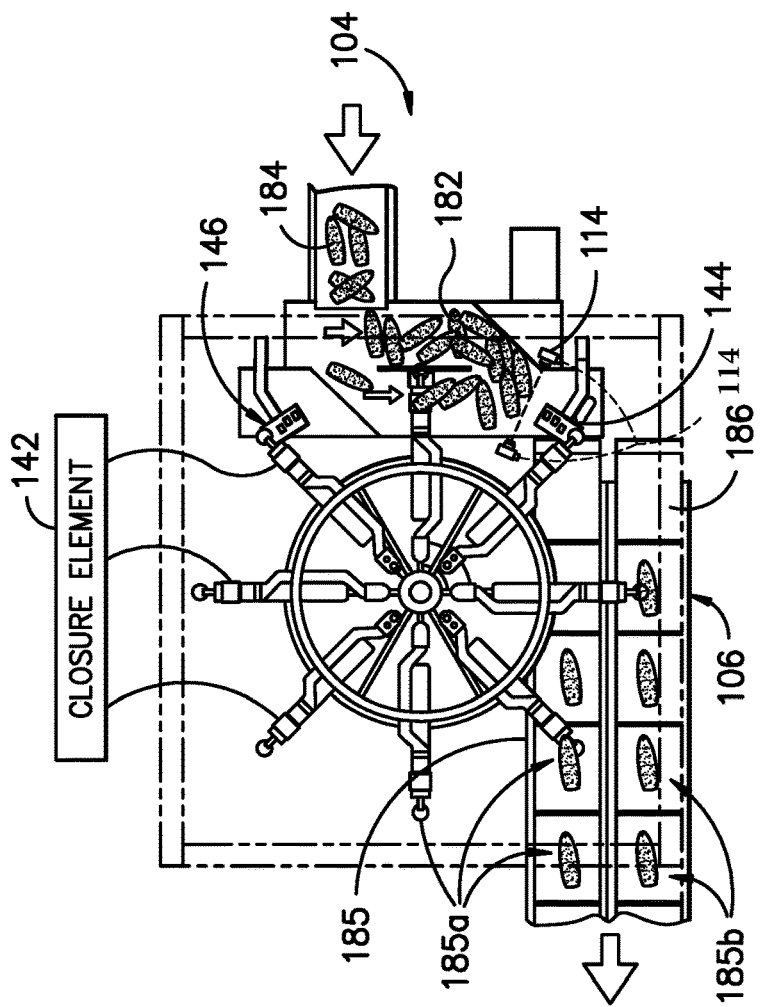
FIG. -4A-

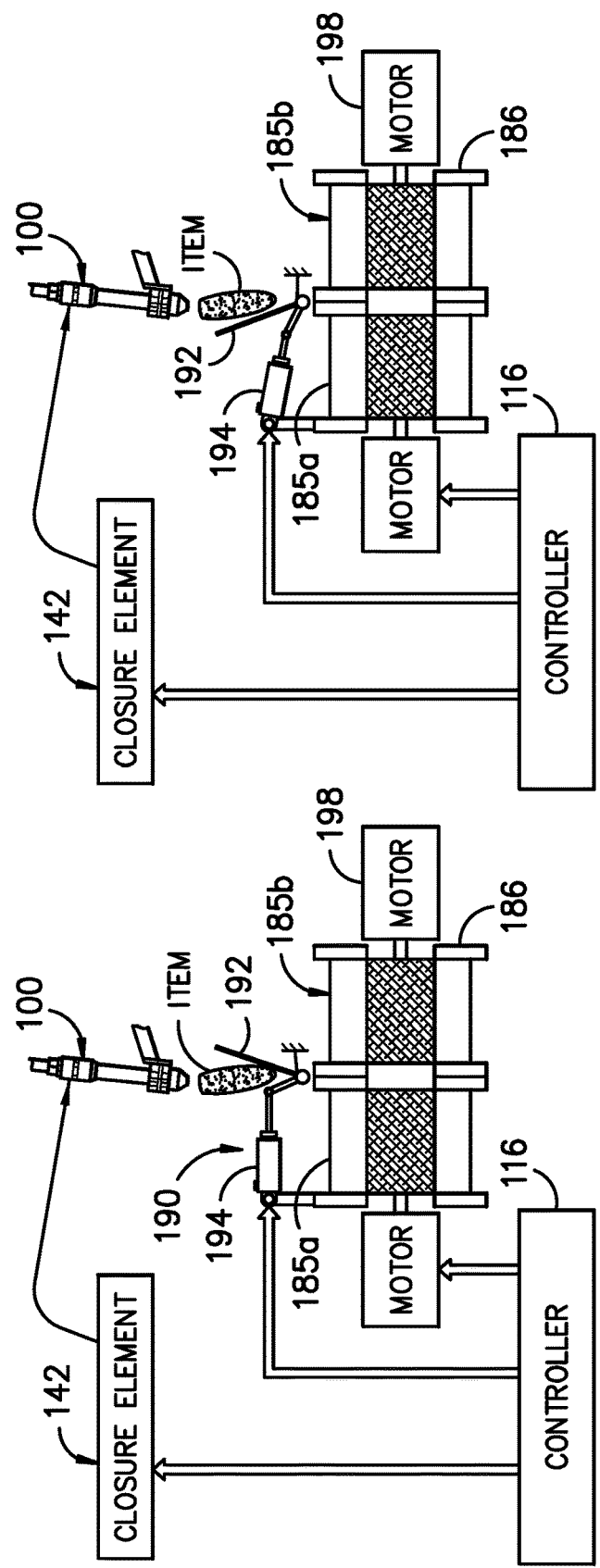

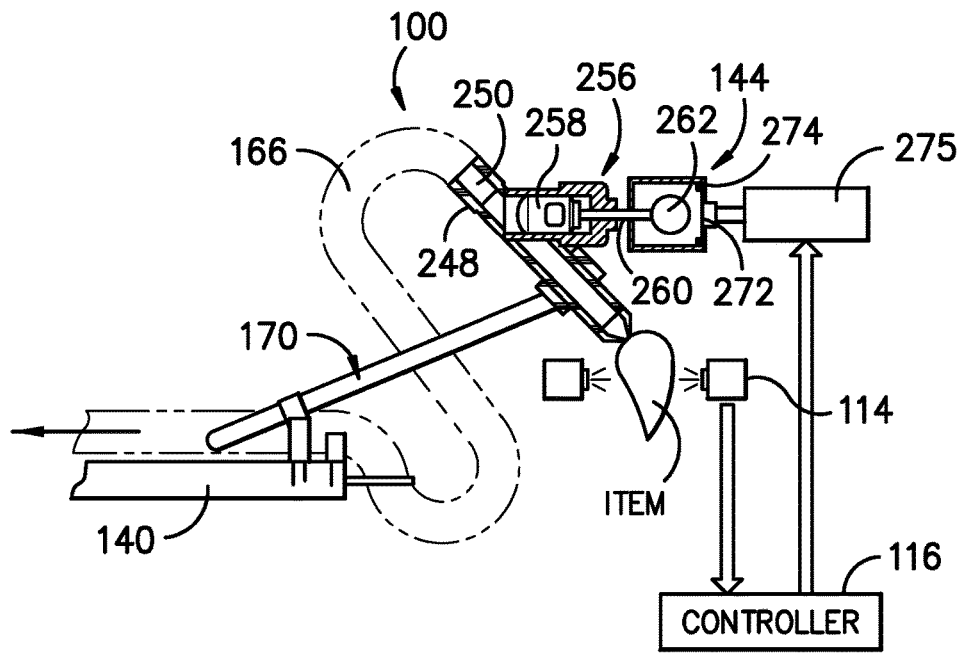
FIG. -5A-
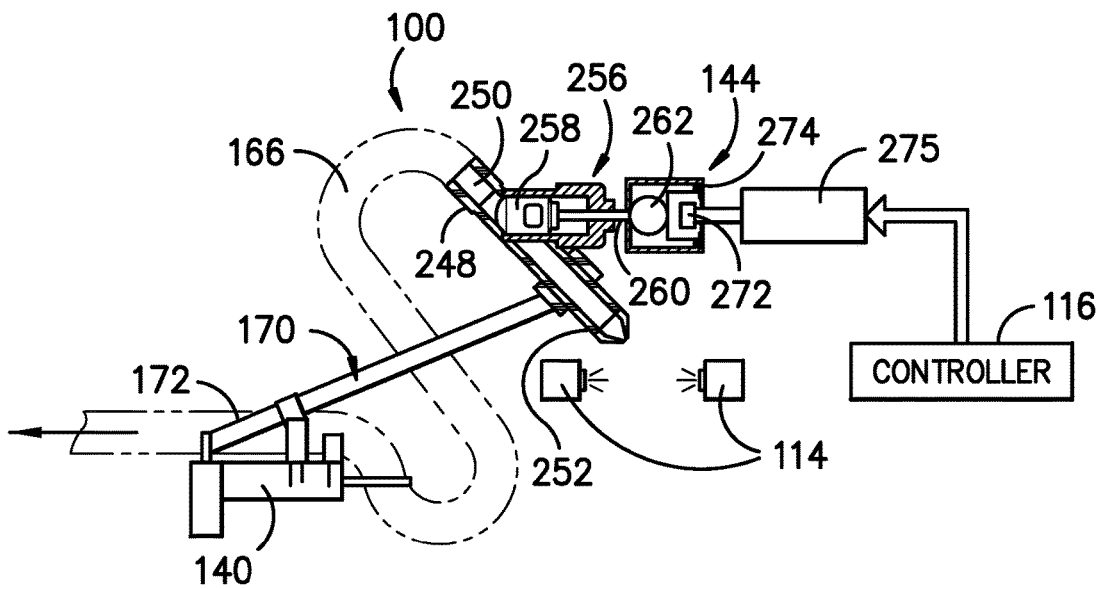
FIG. -5B-

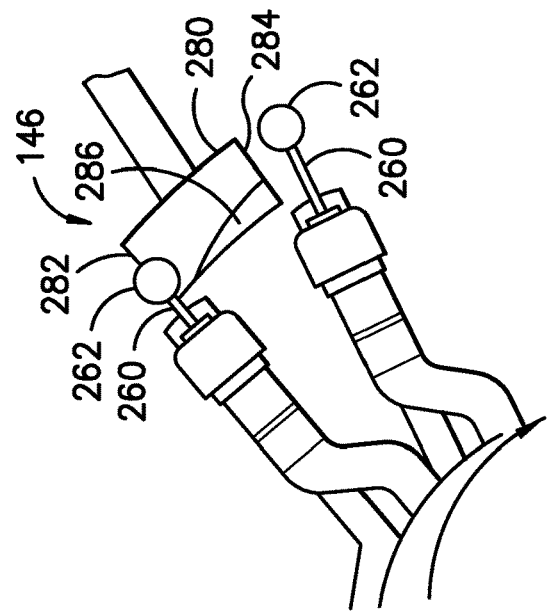
FIG. -5D-
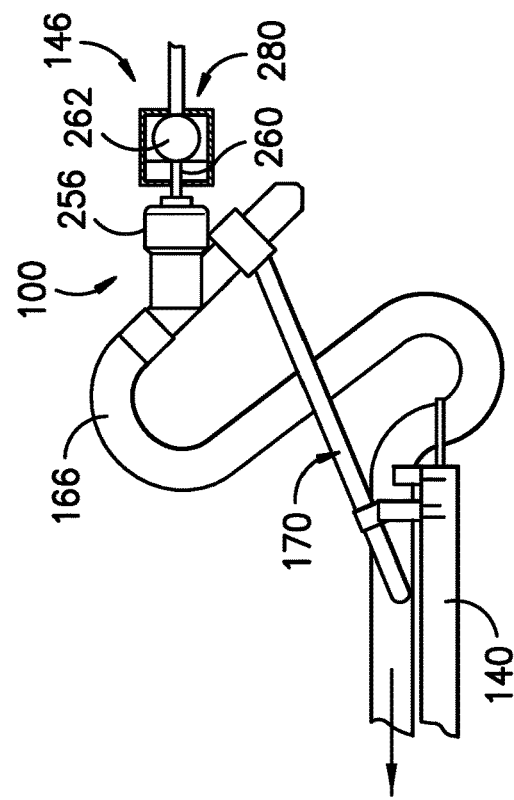
FIG. -5C-

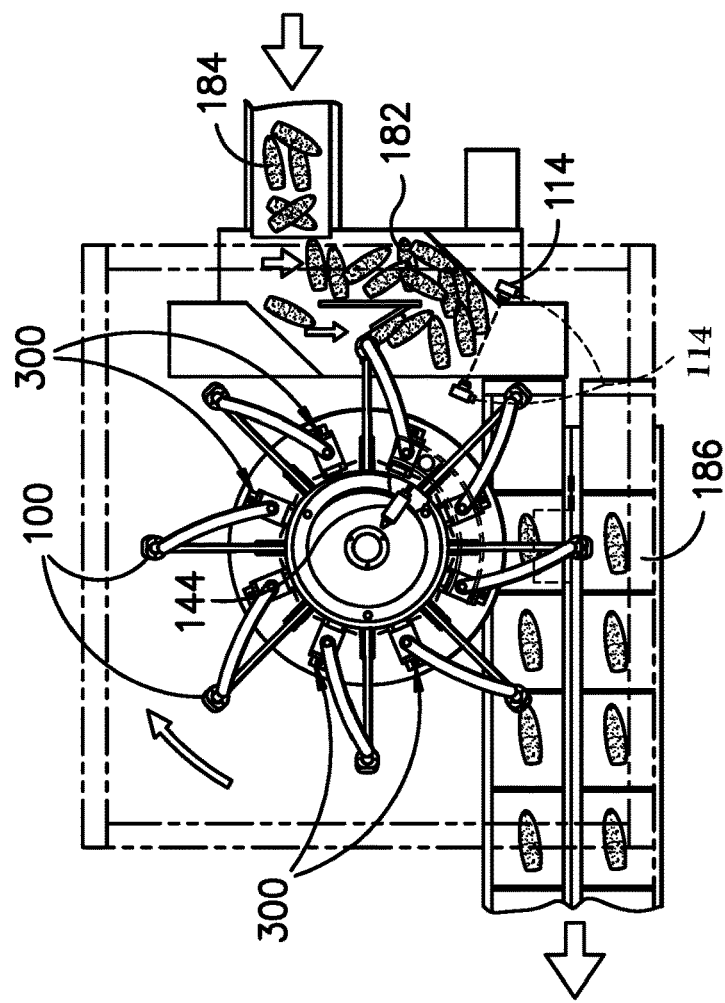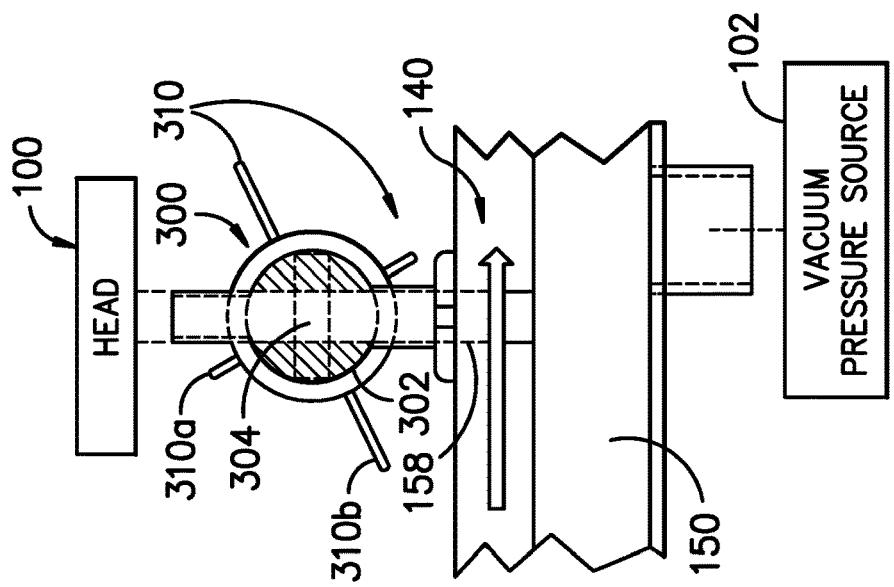

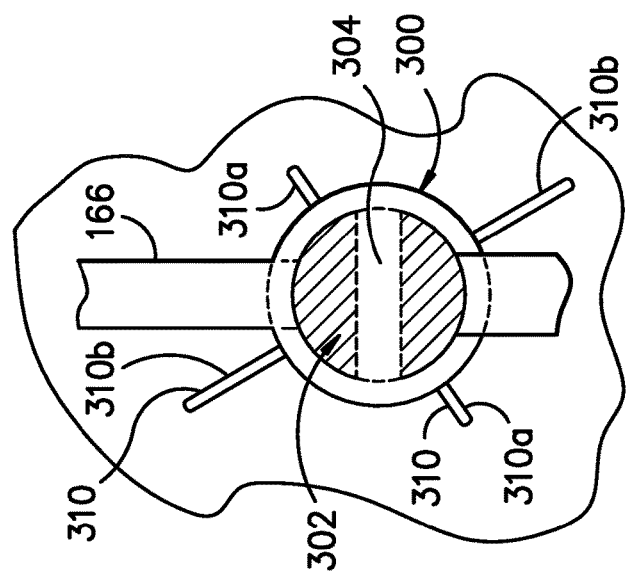
FIG. -6C-
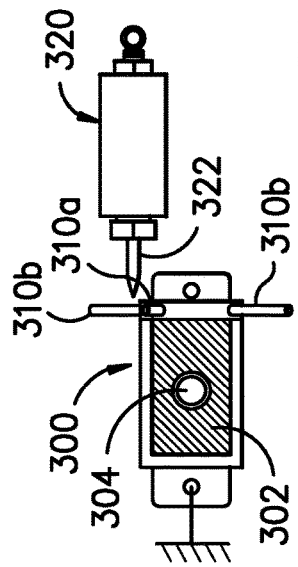
FIG. -6D-
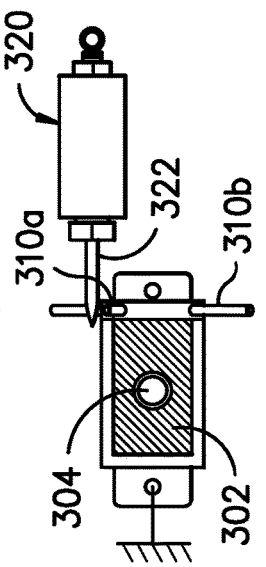
FIG. -6E-
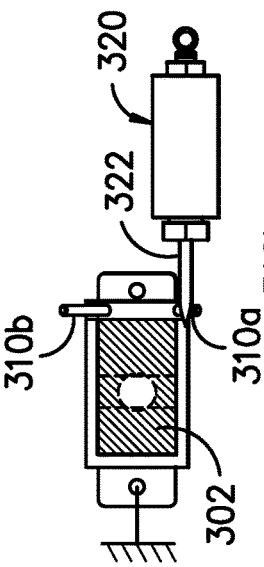
FIG. -6F-
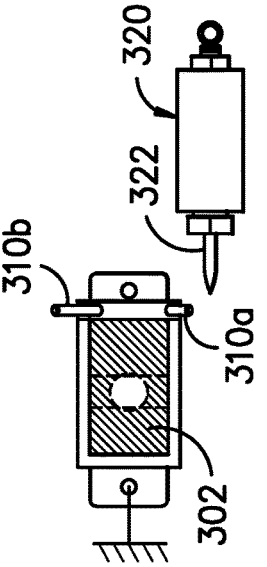
FIG. -6G-

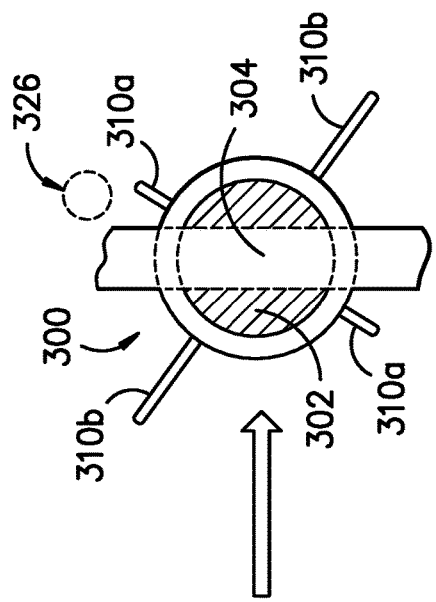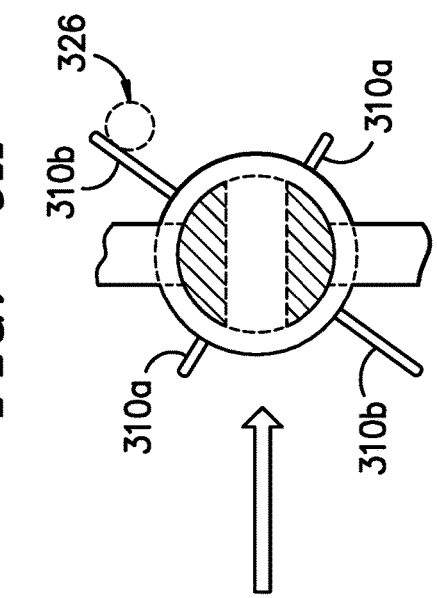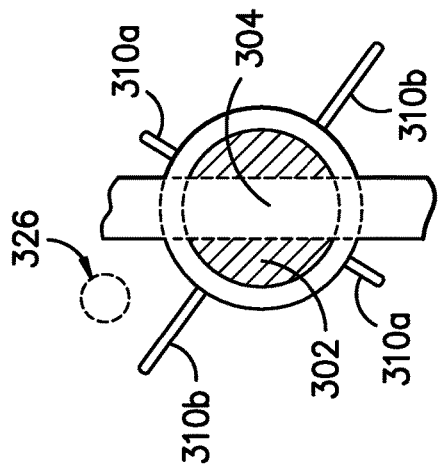

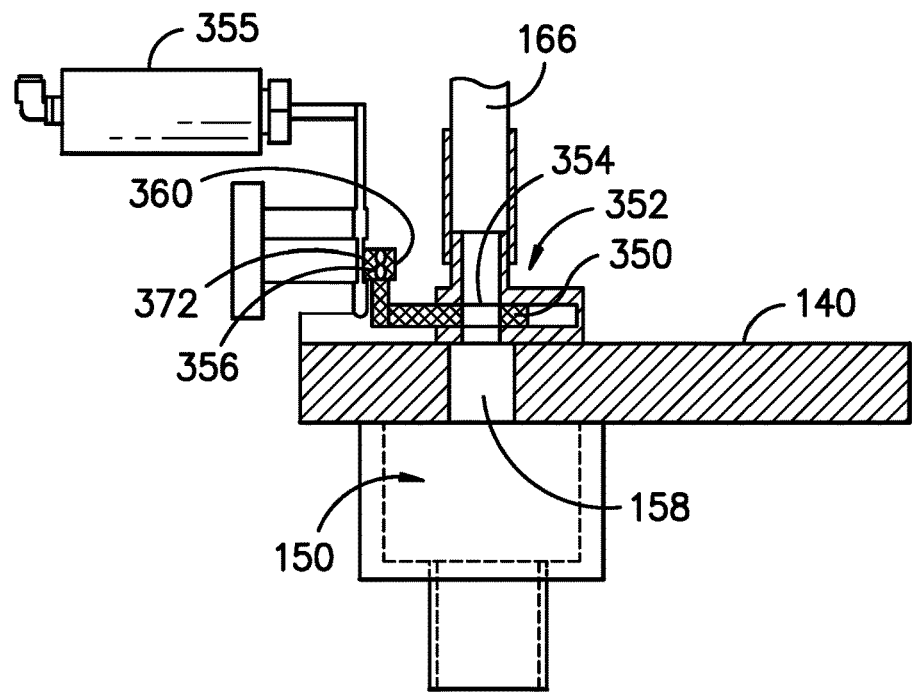
FIG. -7A-
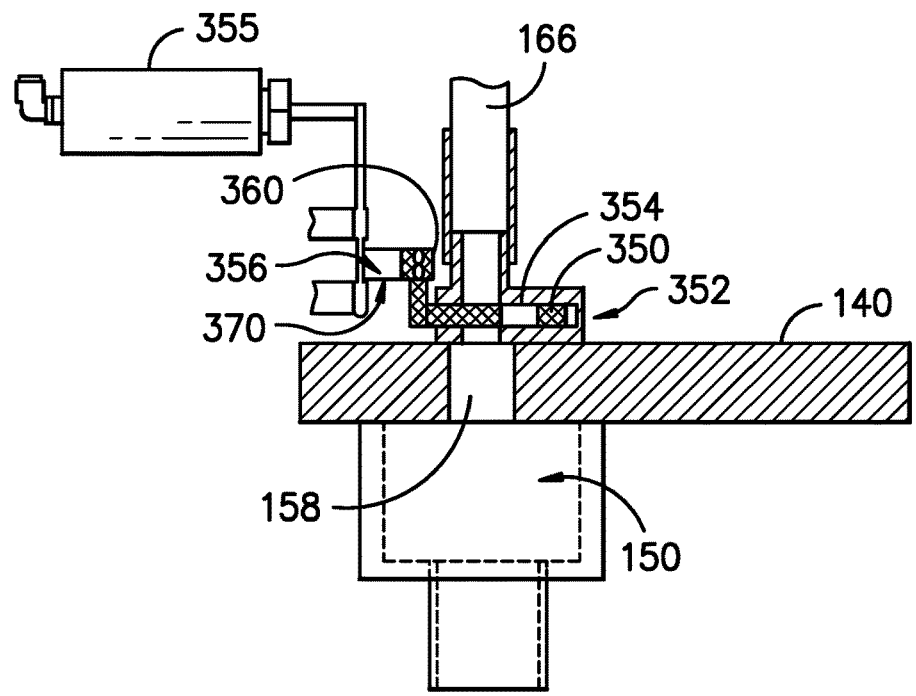
FIG. -7B-

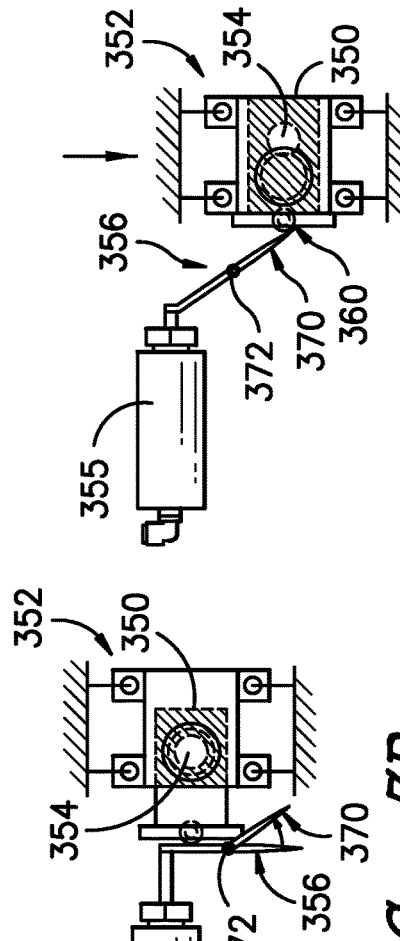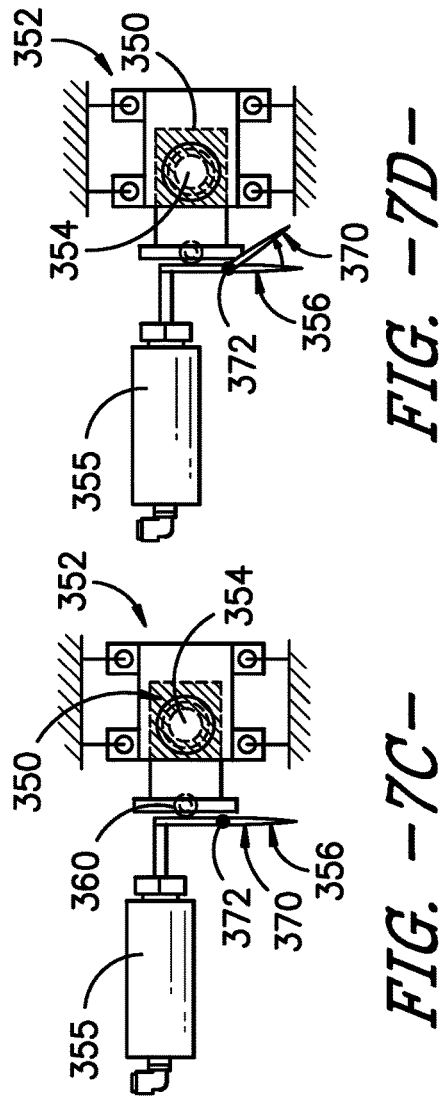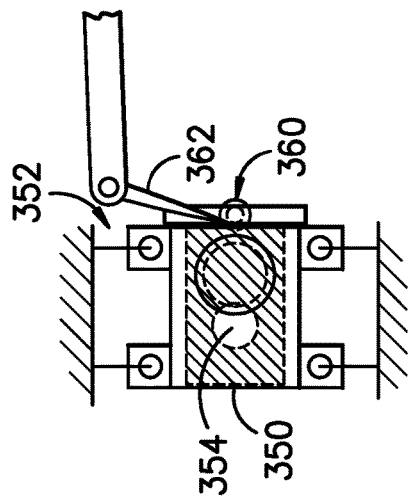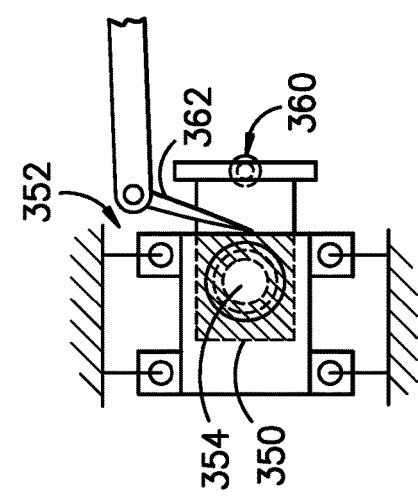

APPARATUS AND METHOD FOR PICK AND PLACEMENT OF BULK ITEMS

CROSS-REFERENCE TO RELATED APPLICATION

The present application claims priority to and the benefit of U.S. Provisional Application Ser. No. 62/496,262 filed Oct. 12, 2016 and entitled METHOD AND APPARATUS TO CONTROL THE AIR FLOW TO AN OBJECT PICK-UP MEANS, the contents of which are hereby incorporated by reference in the entirety into the present application.

BACKGROUND

The present application relates to an apparatus for handling bulk items. Irregular shaped items stored in bulk in an overlapping fashion can be difficult to handle and sort. For example in the food industry, bulk food items such as meat, chicken and poultry are separated and sorted for weighing, cutting, and packaging operations. Automation of this process can reduce labor costs and increase efficiency. However, the irregular shape and features of such items can introduce challenges and interfere with automation.

SUMMARY

The present application relates to an assembly for handling bulk items. As described, the assembly includes a plurality of heads to pick up items from a bin or conveyor. Vacuum pressure is supplied to the plurality of heads to pick up the items. A detector is used to detect or confirm if an item has been picked up by the head. A vacuum control mechanism is coupled to the heads to close the heads to the vacuum pressure if no item is picked up by the head. In illustrated embodiments a closure element is coupled to each of the plurality of heads and is operable between an opened position and a closed position. If no item is detected an actuator element or device is used to close the closure element to preserve vacuum pressure. Closure elements of closed heads are opened via a passive control device to provide vacuum pressure to the heads at a pick-up location of a closed loop path.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a schematic illustration of an embodiment of a pick-n-place assembly of the present application.

FIG. 1B is a flow chart of process steps for an illustrative embodiment of the present application.

FIG. 2A is a schematic illustration of another embodiment of the present application.

FIG. 2B is a cross-sectional view of a support platform and manifold for the illustrated embodiment of FIG. 2A.

FIG. 2C illustrates a profile for the manifold of FIG. 2B.

FIG. 3A illustrates an embodiment of the assembly of the present application in partial cross-section.

FIG. 3B is a detailed view of a pick-up head coupled to a vacuum source through a flexible hose and associated support structure.

FIG. 3C is a detailed illustration of a guide track for moving the head between a raised position and a lowered position to pick up items from a pick-up source or bin.

FIG. 4A is a top view illustrating a plurality of heads movable between a pick-up location and drop location.

FIGS. 4B-4C illustrate a diverter system for placing items in adjacent side-by-side compartments at a drop location.

FIG. 4D is a flow chart illustrating process steps for coordinating operation of the heads and conveyor.

FIGS. 5A-5B illustrate an embodiment of a closure structure on a pick-up head and actuator element of a feedback control device.

FIGS. 5C-5D illustrate an embodiment of a passive control device for the closure structure of FIGS. 5A-5B.

FIGS. 6A-6C illustrate another embodiment of an assembly including a plurality of heads having a closure element coupled to the heads through a flexible hose.

FIGS. 6D-6G progressively illustrate operation of an actuator element for closing the closure element shown in FIGS. 6A-6C.

FIG. 6H illustrates an opened closure element unobstructed by a fixed actuator element of a passive control device.

FIGS. 6I-6J progressively illustrate rotation of the closed closure element illustrated in FIGS. 6A-6B to the opened position via the fixed actuator element of the passive control device.

FIGS. 7A-7B illustrate another embodiment of an assembly having a closure element coupled to the heads through a flexible hose.

FIGS. 7C-7E illustrate operation of a feedback control device to close a closure element in response to a no-item detection.

FIG. 7F illustrates an opened closure element unobstructed by a fixed actuator element of a passive control device.

FIG. 7G illustrates operation of the passive control device for applying force to slide the closure element to the open position before the pick-up location.

It should be understood that the FIGS. are not necessarily drawn to scale and that like numbers have been used to identify like parts in the sequence of FIGS.

DETAILED DESCRIPTION OF ILLUSTRATIVE EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced in any number of alternate ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The present application relates to an assembly and method for handling bulk items as schematically shown in FIG. 1A.

As shown, the assembly includes a plurality of pick-up heads 100 coupled to a vacuum pressure source 102 to supply vacuum pressure to pick-up items from a pickup location 104 and transport the items to a drop-off location 106. In the embodiment shown, the heads 100 move or rotate along a closed loop path between the pick-up location 104 and drop-off location 106 as illustrated by arrows 108. In the embodiment shown, the heads 100 are rotated in a clockwise direction along a circular path via a drive mechanism 110 (illustrated schematically). Application, however, is not limited to a particular direction or circular closed loop path. For example, the path can be oval or elliptical shaped. Although a particular number and arrangement of heads is schematically shown, application is not limited to any particular number or arrangement of heads.

As shown, the assembly includes a detector 114 in the path between the pick-up location 104 and the drop-off location 106 to determine whether the head 100 has picked up an item from the pick-up location 104. If the head 100 has not picked-up an item then the detector 114 provides a "no-item detected" output to a controller 116. The controller 116 uses the output from the detector 114 to operate a vacuum pressure on-off control mechanism 118 coupled to the heads to control vacuum pressure supplied to the heads from the vacuum pressure source 102. In response to the "no-item detected" output from the detector 114, the vacuum pressure on-off control mechanism 118 closes the vacuum pressure to the head 110 to limit pressure loss from an opened head 110 with no item and preserve vacuum pressure for the heads carrying items from the pick-up location 104 to the drop-off location 106.

In an illustrated embodiment, the detector 114 includes a transmitter and receiver aligned in the path between the pick-up location 104 and the drop-off location 106. In an illustrative embodiment, the detector 114 uses optical or infrared sensors or receivers to detect items. The controller 116 is an electronic controller device including one or more hardware or circuit components, logic components and/or a processor and one or more memory devices to provide a control signal to the vacuum pressure on-off control mechanism 118 to close the head 100 if no item is detected.

FIG. 1B is a flow chart illustrating steps incorporating the features of the present application schematically shown in FIG. 1A. As shown in FIG. 1B, one of the plurality of heads 100 is position proximate to the pick-up location 104 and vacuum pressure is supplied to the head 100 as illustrated in steps 120 and 122. In step 124, the detector 114 detects if an item is attached to or has been picked-up by the head 100. If no item is detected in step 126, the head is closed to the vacuum pressure source so that no vacuum pressure is supplied to the head 100 as illustrated in step 128. The head is moved or rotated from the pick-up location 104 to the drop-off location 106 as shown in step 130. In step 132, if the head has picked up an item, the item is released at the drop-off location 106. In particular, the item is released through the application of positive pressure, gravity or through physical contact. For example, in an illustrative embodiment the item is released or "knocked off" the head 106 through a mechanical device or mechanism (not shown). Thus as described, if no item is detected, the head 100 is closed to the vacuum pressure source before moving to the drop-off location 106.

FIG. 2A schematically illustrates another embodiment of an assembly of the present application similar to FIG. 1A. In the embodiment shown, the heads 100 are coupled to a support structure 140 to move the heads 100 along the closed looped path between the pick-up location 104 and the drop-off location 106. The vacuum pressure on-off control mechanism 118 includes closure elements 142 operably coupled to the heads 100 having an opened position to supply vacuum pressure to the heads and a closed position to close the head to the vacuum pressure source 102. As previously described, detector 114 is located aft of the pick-up location 104 to detect if an item has been pick-up by the heads 100. Output from the detector 114 is provided to the controller 116 which is coupled to a feedback control device 144 to shift the closure element 142 to the closed position if no item is detected. Forward of the pick-up location, the assembly includes a passive control device 146 to open the closure element 142 closed by the feedback control device 144 in response to the no item detection.

In the illustrated embodiment, the support structure 140 is a rotating disc to form a circular closed loop path. As illustrated in FIGS. 2A-2B, vacuum pressure is supplied to the heads 100 from the vacuum pressure source 102 through a manifold 150. The heads 100 are coupled to an obverse surface of the support structure 140 and the manifold 150 is supported relative to a reverse surface of the support structure 140. The manifold 150 includes multiple manifold chambers 152a, 152b, 152c which in the illustrated embodiment includes a chamber 152a connectable to the vacuum pressure source 102 to supply vacuum pressure to the heads 100 between the pick-up location 104 and the drop-off location 106, chamber 152b connectable to a positive pressure source 154 to release items at the drop-off location 106 and chamber 152c connectable to a cleaning or sanitizing solution source 156 to clean or sanitize the heads 100 during operation. The heads are coupled to the manifold chambers through supply passages 158 extending through the support platform 140 between the obverse and reverse sides as shown in FIG. 2B. The support platform 140 rotates relative to the manifold 150 through drive mechanism 110 to sequentially position the heads 100 proximate to the manifold chambers 152a, 152b, 152c, to supply vacuum pressure at the pick-up location 104, positive pressure to release an item at the drop-off location 106 and water or other solution during the rotation cycle of the heads 100 after the drop-off location 106 and before the pick-up location 104.

In an illustrative embodiment shown in FIG. 2C, the first chamber 152a includes a circumferential dimension to continuously supply vacuum pressure as the head 100 moves between the pick-up location 104 and the drop-off location 106. The circumference dimension of the second chamber 152b is aligned to provide positive pressure to release an item at the drop-off location 106 and the circumferential length of the third chamber 152c is designed to provide solution to the head after the drop-off location 106 and before or prior the pick-up location 104. In the embodiment shown in FIG. 2C, the drop-off location 106 is orientated generally 90 degrees from the pick-up location 104, however application is not limited to a particular orientation or placement. Although a manifold with three chambers is described, application is not limited to any particular number of manifold chambers.

FIG. 3A illustrates an embodiment of an assembly of the present application where the support platform 140 is rotationally coupled to a base structure 160 and rotated through a drive shaft 162 coupled to a drive motor 164. Manifold 150 is supported below the support platform 140 to provide vacuum pressure to the plurality of heads as previously described. As comparatively shown in FIGS. 3A-3B, the heads 100 are coupled to the manifold and vacuum pressure source through a flexible hose 166. As shown, a support fixture 170 movably supports the heads 100 relative to the base structure 160 and support platform 140 to raise and lower the heads between the pick-up location 104 and drop-off location 106.

In particular the support fixture 170 as shown in FIG. 3B includes a support arm 172 rotationally coupled to support platform 140 through stand 174. The support arm 172 rotates as illustrated by arrow 175 to move the head 100 from the raised position to the lowered position so that the head can pick-up and drop items. The position of the support arm 174 is adjusted during a rotation or closed loop cycle through guide structure 176 coupled to the base structure 160 of the assembly as shown in FIGS. 3A and 3C. As shown in FIG. 3C, the guide structure 176 includes a guide track 178 along the closed loop path. Guide pins 180 on the plurality of heads 100 move along the guide track 178 to control the elevation of the heads 100 relative to the support platform 140 and base structure 160. In particular, the guide track 178 includes raised and lowered track portions to move the heads 100 between the raised and lowered positions along the closed looped path of the heads 100.

FIG. 4A is a top view of an embodiment of the assembly for picking up items from the pick-up location 104 and placing items at the drop-off location 106. As shown in FIG. 4A, items are provided to a pick-up bin or conveyor 182 through an input conveyor 184. For example, the pick-up conveyor is a recirculating conveyor (not shown). The items are transferred from the bin 182 to compartments 185 along an output conveyor 186 via rotation of the heads 100. Prior to bin 182, the closure elements 142 are opened via the passive control device 146 to provide vacuum pressure to the head 100 at the pick-up location 104. In particular, as previously described, before the head 100 reaches the pick-up location 104, the passive control device 146 opens the closed head 100 to provide vacuum pressure to the heads 100. After bin 182, the detector 114 detects if the head 100 has an item and if not the feedback control device 144 operates the closure element 142 to close vacuum pressure to the head 100 prior to rotation of the head to the output conveyor 186. Otherwise if an item is detected, the closure element 142 remains open to provide vacuum pressure to carry the item on the head 100 to the drop-off location 106.

In the embodiment shown, the output conveyor 186 includes side-by-side product compartments 185a, 185b along a length of the conveyor 186. As shown in FIGS. 4B-4C, the assembly includes a diverter mechanism 190 to alternately place one item in a first side-by-side compartments 185a and another item in an adjacent side-by-side compartment 185b. The diverter mechanism 190 as shown includes a diverter 192 to sequentially place items in the side-by-side compartments 185a, 185b. In the embodiment shown, the diverter 192 is rotationally coupled to the base structure and is rotated between a first position as shown in FIG. 4B and a second position as shown in FIG. 4C to place the items in the side-by-side compartments 185a, 185b. As shown the diverter 192 is rotated through actuator 194 operably coupled the diverter 192 through one or more linkages. In an illustrated embodiment, the actuator 194 is a pneumatic cylinder which is coupled to a pneumatic pressure source to move or rotate the diverter 192 between the first and second positions as shown in FIGS. 4B-4C.

As shown, a motor 198 drives or moves the output conveyor 186 for continuous operation. Operation of the motor 198 and diverter 192 is controlled via the controller 116 to time movement of the conveyor 186 with the cycle of the diverter 192 so that each of the side-by-side compartments 185a, 185b is filled prior to moving the conveyor 186 to position the next side-by-side compartments 185a, 185b at the drop-off location 106. As illustrated, in the process steps of FIG. 4D, if no item is detected in step 200, operation of the conveyor motor 198 is paused while the drive mechanism 110 rotates the support platform 140 to advance the next head at the drop-off location 106 as shown in step 202. If an item is detected, the item is released from the head at the drop-off location fill one of the side-by side compartments 185a, 185b as shown in step 204. If both compartments 185a, 185b are filled in step 206, the conveyor motor 198 advances the conveyor 186 to the next side-by-side compartments 185a, 185b in step 208 and the support platform for the heads is rotated in step 210. If both sides are not filled, the actuator 194 operates the diverter 192 to shift the diverter 192 to the unfilled compartment as shown in step 212 to place the next item in the rotation cycle in the unfilled compartment and the support platform is rotated to position the next head at the conveyor 186.

Thus, as described for a double sided conveyor 186, the conveyor is advanced or moved in sequence with the rotation of two heads unless one or both of the heads has no item detected and the operation sequence for the motor 198 and diverter 192 is paused to wait for the items to fill the adjacent compartments 185a, 185b. In another embodiment, the head drops off items along a single row conveyor (not shown). Operation of the conveyor is sequenced with rotation of the heads 100 and support platform 140. If no item is detected operation of the conveyor motor 198 is paused so that the conveyor 186 is not advanced in sequence with the rotation of the support structure 140 until an item is dropped onto the conveyor at the drop-off location 106.

FIGS. 5A-5B illustrate an embodiment of the closure element 142 operably coupled to the head 100 to close vacuum pressure to the head in response to no item detected on the head. As shown, the head includes a cylindrical body 248 having a flow passage 250 coupled to a nozzle tip 252. The closure element 142 as shown is operable in a chamber of a branch structure 256 coupled to the cylindrical body 248 of the head 100 and is movable between a retracted position in the branch structure 256 spaced from the flow passage 250 and an extended position in the flow passage 250 to occlude or plug the flow passage 250 and close vacuum pressure to the nozzle 252 of the head. As shown, the closure element 142 is a plug-type valve element 258.

The plug-type valve element 258 is moved between the retracted position and an extended through a plunger device 260 having an enlarged head 262 which form an interface structure or tool to move the plunger device 260. The plunger device 260 is coupled to the valve element 258 and is moveable between a first position and a second position through operation of an actuator element 272 of the feedback control device 144 in response to no item detected input from the detector 114. In particular in the illustrated embodiment, the enlarged head 262 of the plunger device 260 is movable in a control passage 274 of the feedback control device 144 between a forward position and an aft position via operation of the actuator element 272. The actuator element 272 is moved between a retracted position and an extended position via actuator 275 to interface with the enlarged head 262 to move the valve element 258 from the retracted position to the extended position to plug the flow passage 250 to close the head. In an illustrated embodiment the actuator is a pneumatic cylinder operable to move the plunger device 260 to shift the valve element 258 between the open and closed positions as described.

FIGS. 5C-5D illustrate operation of the passive control device 146 to open the plug-type valve element 258 on the head 100 prior to the pick-up location or bin. As shown, the passive control device includes a passive control passage 280 having an inlet 282, an outlet 284 and a ramped surface 286 between the inlet 282 and the outlet 284. The inlet 282 includes an opening sized to receive the enlarged head 262 of the plunger device 260 either in the retracted and extended positions. The ramped surface 286 extends from the inlet 282 to a smaller sized opening of the outlet 284 aligned with the opened position of the enlarged head 262 of the plunger device 260. As progressively illustrated in FIG. 5D, as the closed head approaches the control passage 280, the enlarged head 262 of the plunger device 260 is in the retracted position. Movement of the enlarged head 262 along the ramped surface 286 moves the plunger device 260 to the extended position to open the head to the vacuum pressure. If the head 262 of the plunger device approaches the inlet 282 in the extended position, the head is not affected by the ramped surface 286 and passes through the passive control passage 280 in the extended or opened position.

FIGS. 6A-6B illustrate an alternate embodiment of a closure element 142 of the present application operable relative to a closure structure 300 supported on the support platform 140 to close vacuum pressure to the heads 100 if no item is detected. In the embodiment shown, the closure structure 300 is operably coupled to the head 100 through the flexible hose 166 and includes an inlet coupled to the supply passages and outlet coupled to the flexible hose 166. As shown in FIG. 6B, the closure element is a rotating valve element 302 which rotates in a valve chamber of the closure structure 300 between an opened position shown in FIG. 6B to provide vacuum pressure to the head and a closed position shown in phantom. In the opened position shown in FIG. 6B a valve passage 304 of the valve element 302 aligns with the inlet and outlet of the closure structure 300 to provide vacuum pressure to the head. In the closed position, the valve passage 304 is not aligned with the inlet and outlet of the closure structure 300 to close the head as shown in FIG. 6C.

In FIG. 6B, the closure structure 300 shown includes a plurality of arms 310 spaced about an outer circumference of the structure to form the interface structure or tool to open and close the valve element. The arms 310 are coupled to the rotating valve element 302 through fasteners (not shown). The plurality of arms 310 include first arms 310a and second arms 310b interspersed about the circumference of the closure structure so that the first arms 310a are located 180 degrees apart, the second arms 310b are located 180 degrees apart and adjacent first and second arms 310a, 310b are ninety degrees apart. In the illustrated embodiment the first arms 310a are shorter that then second arms 310b and in an opened position, one of the first arms 310a is in a top position as shown in FIG. 6B and in the closed position, one of the second arms 310b is in a top position as shown in FIG. 6C. The length of the first arms 310a is sized so that the feedback control device rotates the valve element 302 to the closed position when no item is detected and the second arms 310b are sized so that the passive control device 146 interfaces with the second arms 310b in the closed position to rotate the closed valve element 302 to the open position.

FIGS. 6D-6G progressively illustrate an embodiment of the feedback control device 144 including an actuator 320 operable to move an actuator element 322 between a retracted position and an extended position as comparatively shown to engage the first arm 310a coupled to the valve element 302 in the opened position. As progressively illustrated in FIGS. 6E-6F, in response to a no-item detection, the controller 116 provides input to the actuator 320 to move the actuator element 322 to the extended position in alignment with the first arm 310a at the top of the closure structure. As progressively illustrated in FIGS. 6E-6F, movement of the support platform 140 (and closure structure) along the path past the feedback control device 144 as illustrated by arrow 324 rotates the valve element 302 via engagement of arm 310a with the extended actuator element 322 to the closed position. Thus contact of the actuator element 322 with the first arm 310a coupled to the valve element 302 rotates the valve element 302 from the open position shown in FIGS. 6D-6E to the closed position shown in FIG. 6F. Thereafter, the actuator element 322 is retracted before the next head as shown in FIG. 6G. In the illustrative embodiments, the actuator 320 is a pneumatic cylinder to move the actuator element 322 between the retracted and extended positions.

FIGS. 6H-6J schematically illustrate operation of the passive control device 146. As schematically shown in FIG. 6H, the passive control device 146 includes a fixed actuator element 326 in the path forward of the pick-up location 104. In the opened position the first shorted arm 310a is at the top and moves past the passive control device 146 below the fixed actuator element 326 so that the valve element 302 remains open. In the closed position shown in FIG. 6I-6J, the second arm 310b is located toward the top and is longer than the first arm 310a so that it contacts the fixed actuator element 326 as the closure structure 300 moves past the passive control device 146. Engagement of the second arm 310b with the actuator element 326 rotates the valve element 302 to the opened position as the head moves to the pick-up location as shown in FIG. 6J. Although FIGS. 6A-6J illustrate a particular embodiment, application is not so limited the particular actuator element or interface structure for the valve element 302.

FIGS. 7A-7B illustrate another embodiment of an assembly of the present application having a closure element 142 operable between an opened position and a closed position to control vacuum pressure to the head. As shown, the closure element is a sliding valve element 350 movable within a closure structure 352 coupled to the support platform 140, between an opened position shown in FIG. 7A and a closed position shown in FIG. 7B. As shown, the closure structure 352 includes an inlet coupled to the manifold 150 through passage 158 and coupled to the head through the flexible hose 166. In the opened position a passage opening 354 in the sliding valve element 350 is aligned the inlet operably coupled to the vacuum pressure source and outlet coupled to the head 100. The sliding valve element 350 is moved from the opened position in FIG. 7A to the closed position in FIG. 7B in response to a no-item detection.

In particular as shown in FIGS. 7C-7E, the sliding valve element 350 is moved from the open position to the closed position via an actuator 355 through an actuator element 356 of the feedback control device 144. The actuator element 356 is configured to engage an interface structure or knob 360 on the sliding valve element 350 to move the valve element between the retracted open position and an extended closed position. As progressively shown in FIGS. 7C-7E, in response to no-item detected, the actuator 355 moves the actuator element 356 to engage the interface structure or knob 360 to push the sliding valve element 350 to the closed position so that no vacuum pressure is supplied to the head with no item detected. In the particular embodiment shown, the actuator element 356 is a flapper plate 370 coupled to a piston of actuator 355 through a pin 372 so that retraction of the piston rotates the flapper plate 370 towards the interface structure or knob 360 through pin 372 to close the sliding valve element 350 in response to no-item detected.

FIGS. 7F-7G illustrate an embodiment of the passive control device 146 forward of the pick-up location to open closed heads. As shown, the passive control device 146 includes a fixed actuator element 362 which engages the interface structure or knob 360 on the sliding valve element 350 to open the closed head. In the opened position the actuator element 362 is spaced from interface structure 360 so that the closure structure rotates past the passive control device without action as illustrated in FIG. 7F. Contrastingly, if the valve element 350 is closed, the fixed actuator element 362 engages the interface structure to impart force to the valve element 350 to slide the valve element 350 to the open position as shown in FIG. 7G.

Embodiment of the present application have application for sorting or handling irregular shaped items such as poultry and meat items. In particular, the nozzle or head of the assembly is designed and sized to provide supply sufficient vacuum pressure to provide sufficient force to pick-up a single item from a supply of overlapping irregular shaped items. Vacuum pressure requirements vary depending upon the size of the nozzle and head and size and weight of the items. The vacuum on-off mechanism or closure elements as described, preserve vacuum pressure to provide sufficient vacuum pressure and limit pressure loss due to opened heads to transport items from a pick-up location to a drop location. In illustrative embodiments, the support platform has multiple heads opened to the vacuum source at one time to carry multiple items from a pick-up location 104 to a drop-off location 106. In the particular application described for handling food or poultry items, the multiple chamber manifold not only provides vacuum pressure but positive pressure to release the items, such as poultry which may tend to stick to the head and cleaning and/or sanitizing solution to limit contamination. For food applications, the head 100 is formed of a stainless steel or other food grade material.

While illustrated embodiments have been disclosed, application is not limited to the particular embodiments disclosed, nor the particular arrangement of features and components. It will be appreciated by those skilled in the art that changes and modifications can be made without departing from the spirit and scope of the invention and various features of the embodiments disclosed can be combined in alternate arrangements or combinations.

What is claimed:

1. An assembly comprising:
    a plurality of heads coupled to a drive mechanism to move along a path between a pick-up location and a drop location and the plurality of heads coupled to a vacuum pressure source through a vacuum pressure chamber opened to multiple of the plurality of heads between the pick-up location and the drop location;
    a closure element operably coupled to each of the plurality of heads having an opened position to provide vacuum pressure to the head through the vacuum pressure chamber to pick up an item at the pick-up location and a closed position to close the head to the vacuum pressure chamber;
    a detector located in the path between the pick-up location and the drop location and operable to detect if the heads have picked up the item or no item; and
    a controller configured to receive no item input from the detector and utilize the no item input from the detector to close the closure element of the heads having no item detected.

2. The assembly of claim 1 wherein the path is a closed looped path and the plurality of heads are coupled to a rotating disc structure and the drive mechanism includes a motor coupled to the disc structure to rotate the disc structure to move the heads along the closed looped path between the pick-up location and the drop location.

3. The assembly of claim 1 wherein the assembly comprises a feedback actuator element operable through the controller to close the closure element of the no item detected heads in response to the input from the detector that no item is detected.

4. The assembly of claim 3 and comprising a fixed actuator element configured to open the closure element of the no item detected heads closed by the feedback actuator element prior to the pick-up location.

5. The assembly of claim 3 wherein the plurality of heads are coupled to a support platform and to the vacuum pressure chamber through passages through the support platform and the closure element is operable in a chamber of a closure structure coupled to the support platform and the closure element includes a valve passage aligned with an inlet to the vacuum pressure chamber and an outlet opened to the head in the opened position and in the closed position, the valve passage is not aligned with the inlet and outlet to close the head to the vacuum pressure chamber.

6. The assembly of claim 5 wherein the closure element is a rotary valve element rotatable between the opened position and the closed position through one or more arms coupled to the rotary valve element via the feedback actuator element in response to the no item input from the detector.

7. The assembly of claim 3 wherein the closure element is a valve element moveable between the opened position and the closed position through the feedback actuator element in response to the no item input from the detector.

8. The assembly of claim 1 wherein each of the plurality of heads are connectable to the vacuum pressure chamber through a flow passage and the closure element is operable in a branch structure of the plurality of heads between a retracted position and an extended position and in the extended position the closure element occludes the flow passage through the plurality of heads to close the heads to the vacuum pressure chamber.

9. A method comprising:
    locating the plurality of heads of claim 1 at the pick-up location to pick up an item at the pick-up location and moving the heads from the pick-up location to the drop location to release the item; and
    detecting if the heads have picked up the item at the pick-up location and if no item is detected closing the no item detected head to the vacuum pressure chamber prior to locating the no item detected head at the drop location.

10. The method of claim 9 and comprising;
    moving the heads from the drop location to the pick-up location in a closed loop path; and
    opening the heads closed to the vacuum pressure source prior to placement of the closed heads at the pick-up location in the closed looped path.

11. The method of claim 9 wherein the plurality of heads are coupled to a support platform and the drop location includes an output conveyor movable along a conveyor path through a conveyor motor and comprising:
    rotating the support platform to locate sequential heads of the plurality of heads at the drop location;
    operating the conveyor motor to move the conveyor along the conveyor path in synchronization with the rotation of the support platform to sequentially place items from the plurality of heads onto the conveyor; and
    pausing operation of the conveyor motor for the no item detected head.

12. The assembly of claim 1 and comprising a manifold including the vacuum pressure chamber and a positive pressure chamber aligned with the drop location and the plurality of heads are coupled to a positive pressure source through the positive pressure chamber at the drop location.

13. An assembly comprising:
a plurality of heads coupled to a support platform moveable along a path between a pick-up location and a drop location and connectable to a vacuum pressure source to pick-up items at the pick-up location and including a closure element coupled to the plurality of heads movable between an opened position to supply vacuum pressure from the vacuum pressure source and a closed position to close the heads to the vacuum pressure source;
a detector located in the path between the pick-up location and the drop location and operable to detect if the heads along the path between the pick-up location and the drop location have picked up an item or no-item and provide a no item input if no item is detected;
a feedback control device including an actuator element operable to close the closure element on the heads in response to the no item input if no item is detected, and
a passive control device in the path between the drop location and the pick-up location including a fixed actuator element aligned to open the closure element of the heads closed by the feedback control device as the support platform moves the heads from the drop location to the pick-up location.

14. The assembly of claim 13 and comprising a manifold having a plurality of chambers including a vacuum pressure chamber coupled to the vacuum pressure source and a positive pressure chamber coupled to a positive pressure source and the plurality of heads are connectable to the vacuum pressure chamber and the positive pressure chamber via passages extending through the support platform and movement of the support platform along the path connects the plurality of heads with the vacuum pressure chamber between the pick-up location and the drop location and the positive pressure chamber at the drop location through the passages.

15. The assembly of claim 13 wherein the actuator element of the feedback control device is movable between an opened position and a closed position to close the closure element via operation of a pneumatic actuator in response to the no-item input from the detector.

16. The assembly of claim 13 wherein the closure element is supported on the heads and is movable between the opened position to open a flow passage through the head and a closed position to close the flow passage through the head.

17. The assembly of claim 16 wherein the closure element is a plug-type valve element movable in a branch structure coupled to the head between a retracted position to open the flow passage through the head and an extended position to close the flow passage through the head.

18. The assembly of claim 13 wherein the closure element is movable in a chamber of a closure structure coupled to the support platform and coupled to the head through a flexible hose and in the opened position a valve passage of the closure element is aligned with an inlet to provide vacuum pressure and in the closed position the valve passage of the closure element is not aligned with the inlet so that no vacuum pressure is supplied.

19. The assembly of claim 13 wherein the fixed actuator element of the passive control device comprises a ramp structure having an inlet, an outlet and a ramped surface between the inlet and the outlet to move the closure element of the heads from the closed position to the opened position.

20. The assembly of claim 13 wherein the fixed actuator element of the passive control device is configured to engage an interface structure coupled to the closure element as the closed heads move from the drop location to the pick-up location.

* * * * *